United States Patent
Kim et al.

(10) Patent No.: US 7,976,286 B2
(45) Date of Patent: Jul. 12, 2011

(54) METHOD AND APPARATUS FOR PUMPING LIQUIDS USING DIRECTIONAL GROWTH AND ELIMINATION BUBBLES

(75) Inventors: Chang-Jin Kim, Beverly Hills, CA (US); De-Sheng Meng, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 956 days.

(21) Appl. No.: 11/814,162

(22) PCT Filed: Jan. 23, 2006

(86) PCT No.: PCT/US2006/002212
§ 371 (c)(1),
(2), (4) Date: Jul. 17, 2007

(87) PCT Pub. No.: WO2006/083598
PCT Pub. Date: Aug. 10, 2006

(65) Prior Publication Data
US 2008/0118790 A1 May 22, 2008

Related U.S. Application Data

(60) Provisional application No. 60/647,139, filed on Jan. 25, 2005.

(51) Int. Cl.
*F04F 1/18* (2006.01)
*H01M 8/00* (2006.01)
(52) U.S. Cl. ........... 417/53; 417/208; 417/209; 429/400
(58) Field of Classification Search .................... 417/53, 417/208, 209; 347/61, 62; 429/400, 401, 429/409
See application file for complete search history.

(56) References Cited

U.S. PATENT DOCUMENTS

| | | | |
|---|---|---|---|
| 4,573,525 A | 3/1986 | Boyd | |
| 6,062,681 A * | 5/2000 | Field et al. | 347/65 |
| 6,283,718 B1 * | 9/2001 | Prosperetti et al. | 417/52 |
| 6,450,776 B1 | 9/2002 | Taneya et al. | |
| 6,520,197 B2 * | 2/2003 | Deshmukh et al. | 137/3 |
| 6,869,273 B2 * | 3/2005 | Crivelli | 417/53 |
| 7,431,570 B2 * | 10/2008 | Young et al. | 417/208 |
| 2003/0215334 A1 * | 11/2003 | Effenhauser et al. | 417/52 |

OTHER PUBLICATIONS

PCT International Search Report for PCT/US2006/002212, Applicant: The Regents of the University of California, Form PCT/ISA/210 and 220, dated Sep. 21, 2006 (5 pages).

(Continued)

*Primary Examiner* — Charles G Freay
(74) *Attorney, Agent, or Firm* — Vista IP Law Group LLP (57) ABSTRACT

A method and device for the pumping of liquids utilizes the directional growth and elimination of gaseous vesicles or bubbles to provide the motive or pumping force. In one embodiment, the pumping device is a microfluidic pumping mechanism having a channel, a bubble generator for generating a plurality of bubbles within the channel, and a venting membrane disposed over a portion of the channel downstream of the bubble generator. A one-way valve or directional resistance feature is positioned upstream of the bubble generator to introduce directional transport of bubbles within the channel. The method and device may be integrated into micro fuel cells with organic liquid fuel such that liberated gaseous bubbles may be utilized to deliver fresh fuel or circulate reusable fuel without any power-consuming components.

27 Claims, 7 Drawing Sheets

OTHER PUBLICATIONS

PCT Written Opinion of the International Search Authority for PCT/US2006/002212, Applicant: The Regents of the University of California, Form PCT/ISA/237, dated Sep. 21, 2006 (4 pages).

International Preliminary Report on Patentability for PCT/US2006/002212, Applicant: The Regents of the University of California, Form PCT/IB/326, dated Aug. 9, 2007 (5 pages).

* cited by examiner

METHOD AND APPARATUS FOR PUMPING LIQUIDS USING DIRECTIONAL GROWTH AND ELIMINATION BUBBLES

REFERENCE TO RELATED APPLICATIONS

This Application is a U.S. National Stage filing under 35 U.S.C. §371 of International Application No. PCT/US2006/002212, filed Jan. 23, 2006, which claims priority of U.S. Provisional Patent Application No. 60/647,139 filed on Jan. 25, 2005. The contents of the aforementioned application is hereby incorporated herein by reference in its entirely. Priority to the aforementioned application is hereby expressly claimed in accordance with 35 U.S.C. §§119, 120, 365 and 371 and any other applicable statutes.

STATEMENT REGARDING FEDERALLY SPONSORED RESEARCH AND DEVELOPMENT

This invention was made with Government support under Grant No. DAAH01-1-R001 awarded by the U.S. Department of Defense. The Government has certain rights in this invention.

FIELD OF THE INVENTION

The field of the invention generally relates to devices used to pump or transfer liquids from one location to another. In particular, the field of the invention relates to devices and methods that utilize gaseous fluids such as bubbles to pump liquids. In one aspect of the invention, the device and method can be incorporated into fuel cells to take advantage of their inherent bubble generation capability to provide the pumping force.

BACKGROUND OF THE INVENTION

Microfluidic technology is increasingly being used in a number of devices and applications. As just one example, microfluidic-based technology enables the formation of so-called "lab-on-a-chip" devices that perform complex analysis on fluid-based materials. These devices are often formed using conventional semiconductor processes, enabling the formation of small-sized devices. In many microfluidic-based devices, there is a need to pump or transport a fluid from one location to another. Micromechanical pumps, for example, have been developed to provide the pumping force within a microfluidic environment.

Bubble-driven valve-less micropumps are one attractive driving mechanism for microfluidic-based devices. Compared to micromechanical pumps with moving valves, their fabrication is simpler and reliability is generally higher, due to the absence of wear and tear. Typically, bubbles are formed using thermal generation (i.e., boiling the liquid). Unfortunately, this bubble-actuation method is energy intensive due to the high heat loss present in the microscale environment.

Bubble elimination is also a problem. Typically, vapor bubbles are eliminated by condensation. While bubble generation is activated by heating and fast (e.g., in microseconds for typical microdevices including thermal inkjet), bubble condensation is passive by cooling and far slower (e.g., milliseconds and slower for typical microdevices including thermal inkjet). As a result, the maximum achievable operation frequency of a thermal microdevice is dominated by cooling.

As for other bubble generation methods, removal of insoluble gas bubbles from a sealed device is harder—if even possible at all. This difficulty has been discouraging bubble-driven pumps from using bubble generation methods other than boiling (e.g., direct injection or electrolysis). As a result, most bubble-driven pumps are made having an open configuration (i.e., more like dispensers), such that the bubbles are expelled with the liquid in which they are carried.

Currently, there is no bubble-driven pump suitable to circulate liquid in a closed-loop microfluidic device. Such a pumping mechanism is desirable since many microfluidic devices are closed systems and require circulation of fluids within the system. Such a pump is especially attractive for fuel cells, because it could potentially utilize the existing gas bubbles—the inherent byproducts of any fuel-cell electrochemistry—to pump fuel. One fuel cell that should benefit from such a device is the micro Direct Methanol Fuel Cell ($\mu$DMFC).

There thus is a need for a bubble-based pumping mechanism that can effectuate the directional pumping of a liquid through bubble generation. In addition, the mechanism of the invention described herein would permit the removal of bubbles without having to condense the vapor or completely lose the underlying liquid medium. As a result, the invented bubble-driven micropump can utilize a variety of other gas generation schemes, including, for example, heating, electrolysis, injection, chemical reaction and cavitation. In this regard, the concerns of specific applications (e.g., energy efficiency, thermal sensitivity, bio-compatibility, adjustable flow rate, and the like), can be addressed by the flexibility of different gas generation methods.

SUMMARY OF THE INVENTION

In one embodiment, the invention is directed to a method and device for pumping liquids using the directional growth and elimination of gaseous vesicles (e.g., bubbles). In one aspect of the invention, a plurality of bubbles are formed and released within a fluid-containing passageway (e.g., channel). The bubbles then travel along the channel in a single direction. Travel of the bubbles in a single direction may be caused by one or more valve-like structures that provide lower flow resistance in the desirable direction while provide higher flow resistance in the opposite direction. For example, an asymmetric channel structure adjacent to a bubble provides higher capillary pressure on the smaller side. The bubble tends to grow along the larger microchannel.

Alternatively, bubbles can be coaxed or forced to the desirable direction by making the structures or surface(s) in this direction energetically favorable for bubbles.

Movement of the bubbles within the fluid-containing passageway imparts a motive force on the fluid. The fluid is then transported (e.g., pumped) along the direction of the bubble growth or moving bubbles. The bubbles may be removed from the liquid flow by the use of one or more venting membranes. The venting membranes (which may comprise a non-wetting membrane) include a number of holes or pores through which the gaseous bubbles can pass. Provided that the sizes of the holes or pores are small enough, the liquid can be held within the microchannel with sufficient pressure tolerance.

The fluid-containing passageway may be formed in either a loop configuration (e.g., re-circulating configuration) or an open configuration. Various means of generating bubbles within the fluid-containing passageway may be employed. For example, charged electrodes may be used to generate bubbles via electrolysis. Alternatively, a heating member or element may be used to vaporize or boil a liquid material into a gaseous substance. In yet another embodiment, a cavitation member or element may be used to create gaseous bubbles via cavitation. Alternatively, a gas injector may inject small quantities of gas into the passageway to form the bubbles. In still another alternative embodiment, a chemical reaction may be used as the bubble generating source. This last method is particularly well suited for use in fuel cells, where the gaseous byproduct of the inherent fuel cell reaction may be harnessed into a driving mechanism to pump new or fresh fuel into the fuel cell reactor compartment.

In one embodiment, a fuel cell is provided that includes a pumping mechanism that transports fuel from the fuel source to the reaction portion of the fuel cell based on the generated bubbles from the fuel cell chemical reaction(s). Typically, the micro fuel cells operating with organic liquid fuel generate $CO_2$ gas bubbles in their anodic sides. The pumping mechanism is disposed adjacent to this bubble generating region (or fuel cell reaction portion) and includes a passageway that is connected to a fuel source. A one-way valve may be provided upstream of the bubble generating region to promote or coax the bubbles into traveling in the desired direction within the passageway. The one-way valve may be formed, for example, from a smaller-sized or partially obstructed microchannel. In addition, a venting membrane is disposed over a portion of the passageway in or downstream of the bubble generating region. The bubbles are able to exit the liquid by passing through the porous venting membrane.

In still another embodiment, the invention relates to a method of pumping fluid in a microfluidic environment. A flow path, such as a microfluidic channel, is provided that contains a bubble generator and a venting membrane. Fluid flow is initiated within the flow path using bubbles generated by the bubble generator. The bubbles travel in the same direction and their movement imparts movement to the surrounding working fluid. The bubbles are then removed from the fluid by the use of a venting membrane.

In still another aspect of the invention, a method of pumping fuel in a fuel cell includes the steps of providing a flow path in a fuel cell, the flow path being optionally connected to a fuel source. The flow path includes a venting membrane in a portion thereof. Directional flow is initiated within the flow path using bubbles generated by the fuel cell. The bubbles are then removed from the fuel using the venting membrane. In one aspect of the method, the pumping force created by the bubbles is used to replenish or re-circulate the fuel cell with fuel from the fuel source (e.g., fuel tank). The method has particular applicability for micro fuel cells with organic liquid fuel, e.g., μDMFC.

It is thus one object of the invention to provide a method and apparatus for the directional growth and transport of bubbles within a fluidic environment. It is an additional embodiment of the invention to provide a means of removing bubbles entrained in a fluid flow. The bubbles are able to be removed from fluid flow without having to rely on condensation, dissolution, or diffusion. It is a further object of the invention to provide a device and method that utilizes "ephemeral" bubbles to provide a motive or pumping force to a fluid contained within a flow path. The device and method has particular applicability to small-scale devices such as microfluidic-based devices. It is still another object of the invention to provide a pumping mechanism that can be implemented in fuel cells that utilizes the gaseous byproduct(s) as a driver for a new or fresh fuel for the fuel cell. The pumping method also enables the use of insoluble gas bubbles for the liquid delivery in various microfluidic devices, so as to address the concerns of specific applications, such as energy efficiency, thermal sensitivity, bio-compatibility, or adjustable flow rate.

Further features and advantages will become apparent upon review of the following drawings and description of the preferred embodiments.

BRIEF DESCRIPTION OF THE DRAWINGS

FIG. 3A is a magnified plan view of a portion of a microfluidic-based pumping device. FIG. 3A shows the formation of a bubble by a bubble generator. The bubble is deposited in a microfluidic channel and begins moving in the direction of the arrow within the microfluidic channel (right direction).

FIG. 3B illustrates the bubble shown in FIG. 3A passing from the microfluidic channel to a region covered by a venting membrane.

DETAILED DESCRIPTION OF THE PREFERRED EMBODIMENTS

Figure 1A:
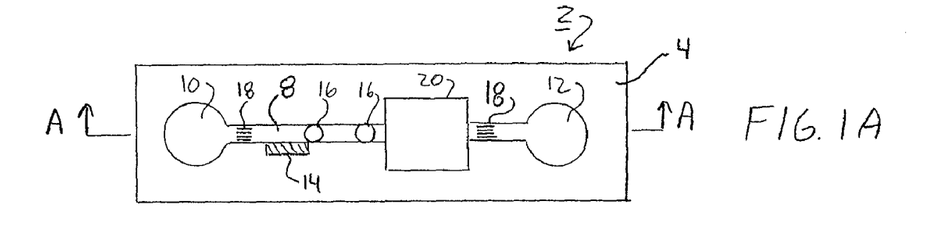
FIG. 1A is a top down plan view of a microfluidic-based pumping device according to one embodiment of the invention. The pumping device is shown having an open configuration.
Figure 1B:
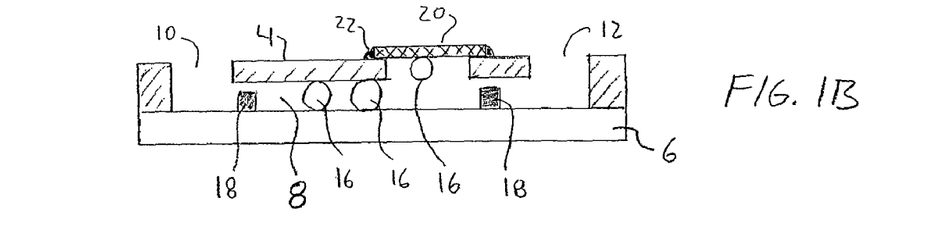
FIG. 1B is a cross-sectional view of the microfluidic-based pumping device of FIG. 1A taken along the line A-A.

FIGS. 1A and 1B illustrates a pumping device 2 according to one embodiment of the invention. The pumping device 2 may be formed as a microfluidic-based pump 2 that is formed inside a substrate 4 which can be easily micromachined to form microchannels, e.g. silicon or PDMS (Polydimethylsiloxane). The substrate 4 is bonded or otherwise secured to secondary substrate 6 such as a glass plate or the like to close the microchannel. One or more channels 8 are formed between the first and second substrates 4, 6. The channel(s) 8 may be connected to an inlet 10 and outlet 12 as is shown in FIGS. 1A, 1B. FIGS. 1A and 1B illustrate an embodiment of a pumping device 2 in an open configuration, wherein fluid (not shown) contained within the channel 8 does not re-circulate or recycle within the device 2.

The pump device 2 includes a bubble generator 14. The bubble generator 14 is disposed at or adjacent to the channel 8 and is used to generate a plurality of individual gaseous vesicles or bubbles 16 within the channel 8. The bubble generator 14 may be formed, for example, from one or more electrodes that generate bubbles form the electrolytic decomposition of the fluid contained within the channel 8. Alternatively, the bubble generator 14 may be formed from a heating element that creates vapor bubbles 16 from the fluid within the channel 8. In still another embodiment, the bubble generator 14 may be formed from a cavitation element. Bubbles 16 are generated by cavitation within the fluid. For example, the application of high frequency sound waves (e.g., ultrasonic energy) may be used as the cavitation source. In still another aspect, the bubble generator 14 may be formed from a gas injector. The gas injector may be coupled to a source of gas (e.g., compressed gas source or on-chip gas generator) that is modulated to eject small quantities of gas within the channel 8. In still another embodiment, the gas generator 14 is a chemical reaction. For instance, in certain fuel cells, gaseous bubbles are formed as a byproduct of an electrochemical reaction. These gas bubbles, which in conventional fuel cells must be removed, can be harnessed to pump or drive fresh or recycled fuel to the fuel cell.

Figure 6:
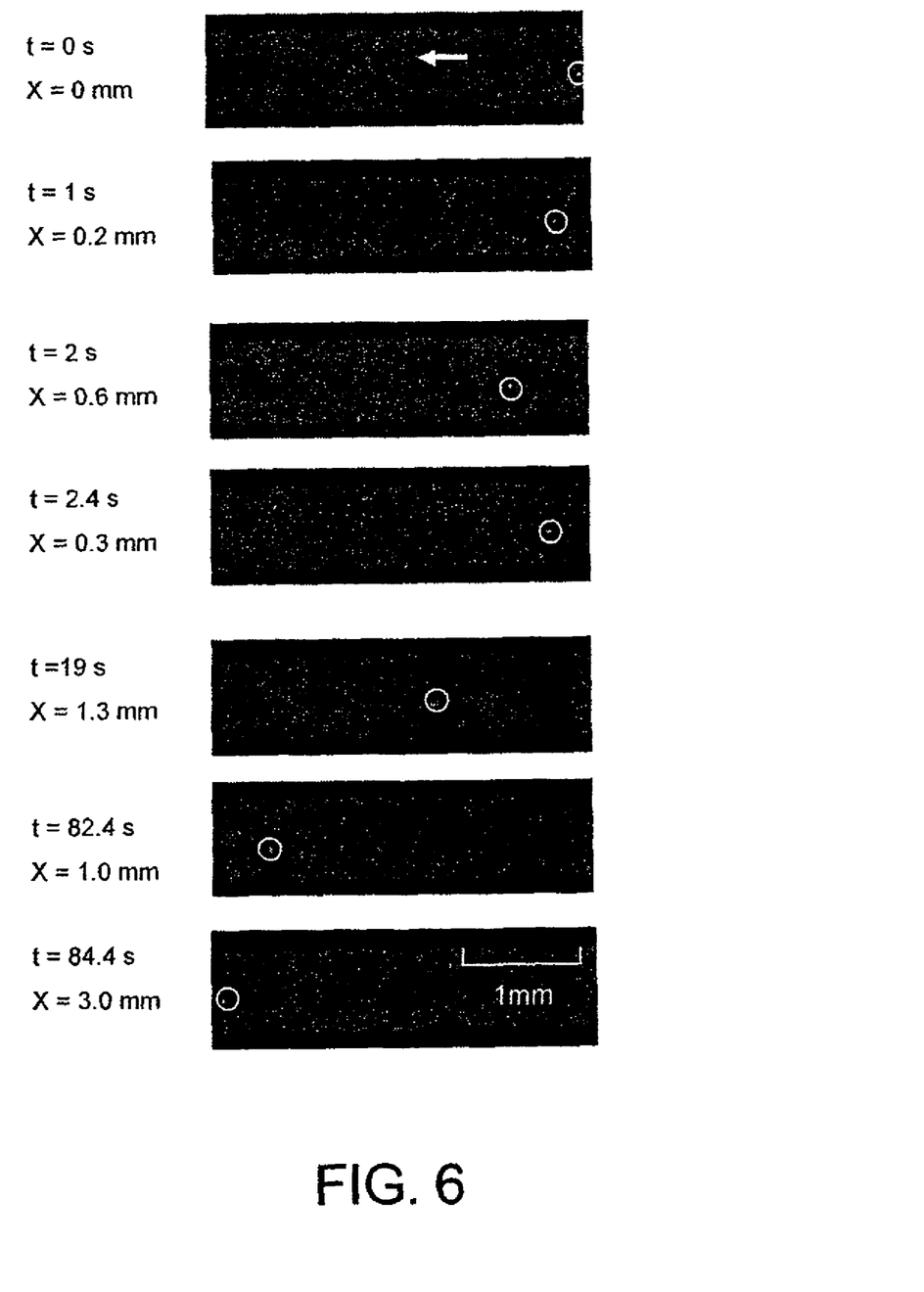
FIG. 6 shows a panel of photomicrographs illustrating the motion of a fluorescently labeled particle within the fluid flow of the pumping device. Images are shown at 0 seconds, 1 second, 2 seconds, 2.4 seconds, 19 seconds, 82.4 seconds, and 84.4 seconds.

As seen in FIG. 1B, the bubble generator 14 generates multiple bubbles 16 or a "bubble train" within the channel 8. The bubble train produces pulsatile movement of the fluid within the channel 8. FIG. 6, discussed in more detail below, details the progression of a fluorescently labeled particle within a pulsatile flow.

Still referring to FIGS. 1A and 1B, a smaller microchannel is used as a one-way valve 18 which is located upstream (with respect to the flow direction (left-to-right flow direction in FIGS. 1A and 1B). The one-way valve 18 prevents bubbles 16 from moving in the wrong direction (in this case left) within with channel 8. The one-way valve 18 may be formed as a partial obstruction within the channel 8 as is illustrated in FIGS. 1A and 1B. The partial obstruction may take the form of a plurality of posts or projections disposed within the channel 8. Alternatively, the one-way valve 18 may be formed by reducing the cross-sectional area of the channel 8 (e.g., smaller microchannel).

In order to remove the bubbles 16 from the fluid flow within the channel 8, a downstream portion of the channel 8 is covered with a venting membrane 20. The venting membrane 20 may be formed from a non-wetting (e.g., hydrophobic), porous membrane. For example, the venting membrane 20 may be formed using a porous PTFE membrane (e.g., PTFE membrane with 3 µm pore diameter available from MILLIPORE) or a porous polypropylene membrane (e.g., porous polypropylene membrane with 0.2 µm pore diameter available from CHEMPLEX INDUSTRIES). As is best seen in FIG. 1B, when the bubble 16 enters the region of the device 2 with the venting membrane 20, the bubble 16 abuts against the inner surface of the venting membrane 20 and gas contained in the bubble 16 is expelled outside the device 2 via the pores or holes contained in the venting membrane 20. It should be noted that the gravitational impact on the device 2 is limited and the device 2 will work in other orientations. In one aspect, the pores or holes may be sized such that the average diameter is less than 1 mm. In still another aspect, the pores or holes may be sized such that the average diameter is less than 1 µm. The venting membrane 20 may be secured to the upper substrate 4, for example, through the use of an adhesive 22 material such as an epoxy-based material.

As seen in FIGS. 1A and 1B, the device 2 includes an optional one-way valve 18 located downstream of the venting membrane 20. The optional one-way valve 18 ensures that the bubbles 16 are retained in the gas venting region of the device 2 which is covered by the venting membrane 20. The one-way valve 18 may be constructed as a partial obstruction of the channel 8 as is explained in detail above.

Figure 2A:
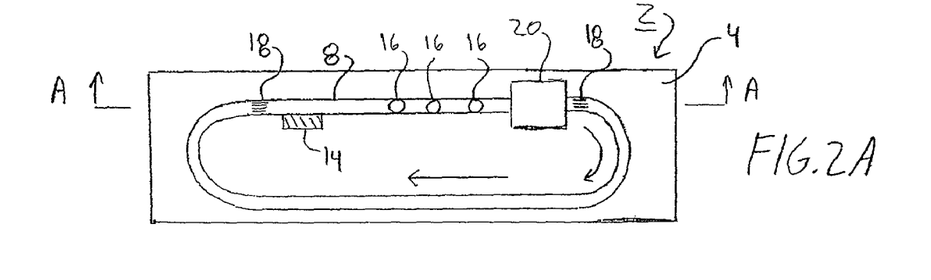
FIG. 2A is a top down plan view of a microfluidic-based pumping device according to another embodiment of the invention. The pumping device is shown having a closed loop configuration.
Figure 2B:
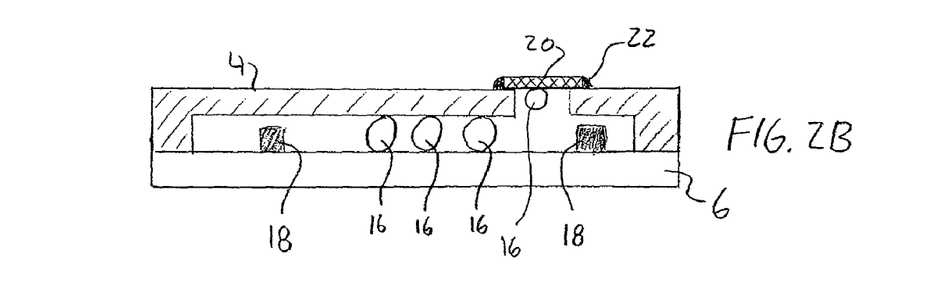
FIG. 2B is a cross-sectional view of the microfluidic-based pumping device of FIG. 2A taken along the line A-A.

FIGS. 2A and 2B illustrate an alternative embodiment of a pumping device 2. The pumping device 2 is similar to the device 2 illustrated in FIGS. 1A and 1B with the exception that the device 2 has a closed loop configuration. In this configuration, flow of the fluid is re-circulated in a loop. As best seen in FIG. 2B, the flow progresses in a clockwise fashion in the direction of the arrows. The closed loop device 2 includes a bubble generator 14, one-way valves 18, and a venting membrane 20. The device 2 may include one or more inputs and/or outputs (not shown) that can be used to load or remove working fluid contained within the channel 8 of the device 2.

Figure 2C:
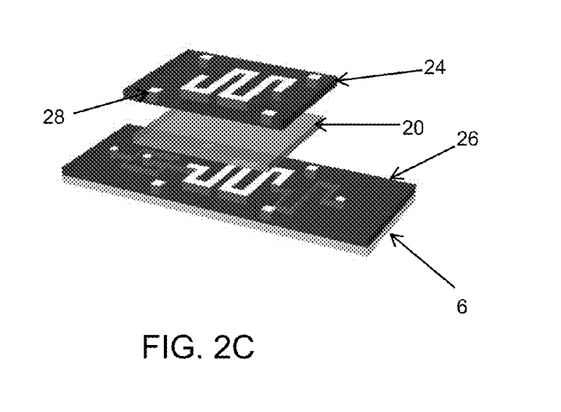
FIG. 2C shows the process used to glue the venting membrane between the microchannel and membrane holder, so as to complete a gas venting microchannel or a breather. The exploded perspective view of the device shows the permeable venting membrane in a sandwich configuration between upper and lower microfluidic components.

FIG. 2C illustrates a process to assemble and glue the gas venting region of a microchannel 8 of a pumping device 2. In the device 2 shown in FIG. 2, the venting membrane 20 is sandwiched between a membrane holder 24 and a lower substrate 26. The membrane holder 24 and lower substrate 26 may be formed form a semiconductor-based material (e.g., a 400 µm thick (100) silicon wafer). The channels 8 within the device 2 may be formed by subjecting the membrane holder 24 and substrate 26 to deep reactive ion etching (DRIE). The membrane holder 24 and substrate 26 may be subject to piranha [five parts sulfuric acid with one part hydrogen peroxide] cleaning and bonded to a glass substrate 6 such as PYREX glass. The venting membrane 20 is sandwiched between the membrane holder 24 and the lower substrate 26 using an adhesive such as an epoxy. Through holes 28 on both substrates 24, 26 are used as alignment marks. The alignment is assisted by strong illumination from below.

Figures 3A, 3B:
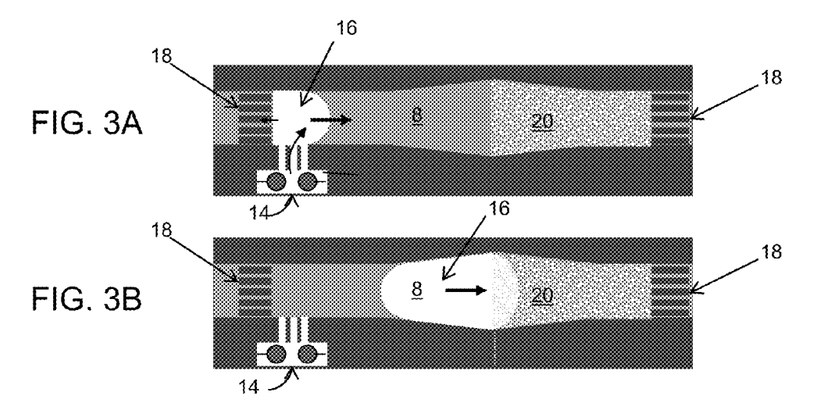
Figure 3C:
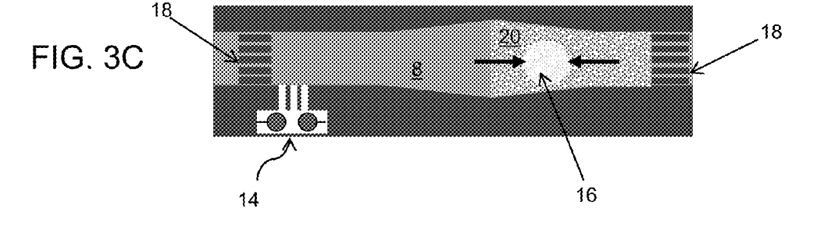
FIG. 3C illustrates the bubble shown in FIG. 3B completely contained within the region of the device having the venting membrane. The bubble is shown in a partially reduced state because of gas passing through the venting membrane.

FIGS. 3A-3C illustrate the pumping concept utilized by the pumping devices 2. The pumping cycle is divided into three steps as shown in FIGS. 3A-3C. As seen in FIG. 3A, the bubble 16 is generated by the bubble generator 14 (in this case by electrolysis electrodes). The bubble 16 is shown growing in the channel 8 adjacent to a screen of relatively narrower channels, i.e., one-way valve 18. Expansion of the meniscus of the bubble 16 is hindered by the one-way valve 18 disposed upstream of the bubble generator 14 so that the bubble 16 only grows to the right and pushes the liquid within the channel to the right.

FIG. 3B shows the advancement of the bubble 16 along the channel 8. The bubble 16 in the diverging hydrophilic channel 8 tends to move to the right (the wider side) by Laplace pressure. Once the bubble 16 reaches the venting membrane 20, the bubble 16 is drawn into the venting region.

FIG. 3C shows the bubble 16 being vented out through the venting membrane 20 and the liquid fills into the section symmetrically. A pump cycle is thus completed and a net pumping to the right is achieved. The diverging microchannel 8 can help the rightward motion of the bubble 16. However, it is not mandatory because the bubbles 16 located in the microchannel 8 can be driven rightward either by the newly generated bubble on the left side or by the bubble capturing effect on the right side.

Although the concept is illustrated with a single bubble 16, the coexistence of multiple bubbles 16 (i.e., a bubble train) is typically used for pumping provided that the venting rate of the venting membrane 20 is sufficient to remove all the bubbles 16. Therefore, continuous generation of bubbles 16 can be used to drive the pumping device 2. This is different from traditional thermal-bubble-driven pumps, which use pulse power input to generate a vapor bubble and then turn off the heater to wait for bubble collapse. Tolerance of constant bubble 16 generation without the need for precise modulation can significantly simplify the driving circuitry (i.e., reduce power consumption) and enable its application in micro fuel cells where the bubbles are generated in a continuous manner.

Figure 4A:
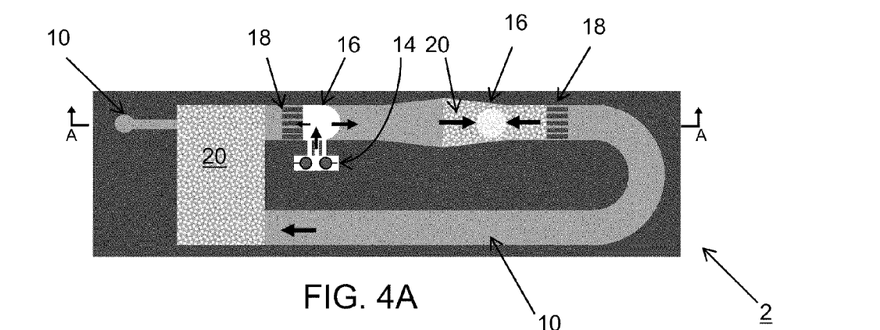
FIG. 4A is a top down plan view of a test apparatus. The test apparatus is configured in a closed loop configuration and uses electrolysis electrodes to generate a train of bubbles to drive the pumping device.
Figure 4B:
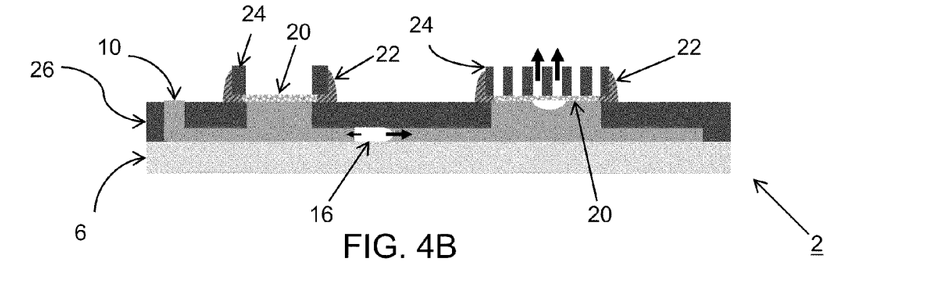
FIG. 4B is a cross-sectional side view of the device illustrated in FIG. 4A taken along the line A-A.

FIGS. 4A and 4B schematically illustrate a test pump 2 used to prove the bubble-pumping concept. In this pumping device 2, the bubble generator 14 used two platinum electrode wires that functioned as electrolysis electrodes. The membrane holder 24 and substrate 26 were fabricated from the same 400 µm-thick (100) silicon wafer by DRIE etching. In the pump chip (i.e., substrates 24, 26), the channels 8 underlying the venting membrane 20, the reservoir and the connection port were etched through, while other parts of the pump loop were protected by polyimide tape once the DRIE etching reached the desired depth.

After DRIE and subsequent piranha cleaning, the substrate 26 was anodically bonded to a lower substrate 6 (a piece of PYREX glass). Then the venting membrane 20 was sandwiched between the membrane holder 24 and substrate 26 with the aid of epoxy adhesive 22, to form channels 8. During the epoxy adhesive bonding, through-holes 28 on both chips 24, 26 were used as alignment marks. The alignment is assisted by strong illumination from below. Details of this alignment and bonding technique are described in D. Meng et al., *A Membrane Breather for Micro Fuel Cell with High Concentration Methanol*, Proc. Hilton Head 2004: A Solid State Sensor, Actuator and Microsystems Workshop, Hilton Head Island, S.C., 2004, pp. 141-144 which is incorporated by reference as if set forth fully herein.

The finished pump device 2 was subsequently connected to a syringe via a set of UPCHURCH tubing/fitting/adapter apparatus. Before being tested, the pump device 2 was pre-filled with $Na_2SO_4$ water solution as the working fluid. The presence of ions can lower the voltage drop between the anode and cathode and therefore facilitate the electrochemical reaction. Since the reservoir was covered by a venting membrane 20, the gas bubbles 16 accidentally introduced during the filling can be purged. The pump loop can thus be kept bubble-free to avoid bubble-clogging problems.

A DC voltage was applied on the two platinum electrodes after the pump loop was ready. Substantial electrolysis was observed when the voltage was higher than 10V, although the theoretical minimum voltage for electrolysis of water is around 1.23V. The main reason for this relatively high operation voltage was attributed to the distance between the two electrodes (~2 mm). A much lower operation voltage can be expected if the electrodes are lithographically integrated into the device 2.

Figure 5:
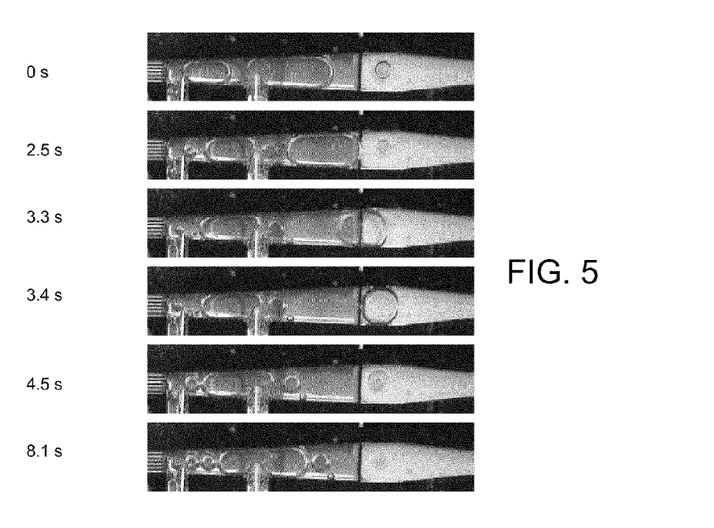
FIG. 5 illustrates a panel of photomicrographs illustrating the formation and transport of bubbles within a test apparatus like that illustrated in FIG. 4A. Images are shown at 0 seconds, 2.5 seconds, 3.3 seconds, 3.4 seconds, 4.5 seconds, and 8.1 seconds.

FIG. 5 illustrates a panel of photomicrographs illustrating the formation and transport of bubbles 16 within a test device 2. Photomicrographs are shown at 0 seconds, 2.5 seconds, 3.3 seconds, 3.4 seconds, 4.5 seconds, and 8.1 seconds. The operating voltage of the electrolysis electrodes was 20V. Unlike the boiling/condensation cycle for thermally-created bubbles, electrochemical bubble generation does not have to be stopped or "turned off" during the bubble condensation process. Accordingly, a constant applied DC voltage (as opposed to a pulse) is used for continuous generation of gas bubbles 16. In this way, pumping efficiency can be improved and the driving circuitry can be simplified.

FIG. 6 shows a panel of photomicrographs illustrating the motion of fluorescently labeled particles within the fluid flow of the pumping device. A single representative particle cluster is circled to illustrate its travel path over a period of time. Images are shown at 0 seconds, 1 second, 2 seconds, 2.4 seconds, 19 seconds, 82.4 seconds, and 84.4 seconds.

Fluorescent particles (4 µm in diameter) were mixed into the working fluid of the device 2 shown in FIGS. 4A and 4B to visualize the flow. The device 2 was operated at a driving voltage of 20 V. The flow of the fluid contained within the channel 8 is pulsatile in nature. Even though the flow is pulsatile, there is a net flow of fluid within the device (in the direction of the arrow shown in the top image of FIG. 6). Particle clusters can be distinguished easily and used to measure the flow velocity at different operation voltages. Because the cross-sectional area of the microchannel 8 was 600 µm×300 µm, the volumetric flow rate can be calculated.

The operating parameters of the device 2 at various input voltages (V) are set forth in Table 1 below.

TABLE 1

| Voltage (V) | 10 | 20 | 30 | 40 |
|---|---|---|---|---|
| Average Current (mA) | 0.20 | 0.69 | 1.32 | 2.13 |
| Average Power (mW) | 2.0 | 13.8 | 39.6 | 85.2 |
| Particle Velocity (µm/s) | 25 | 33 | 50 | 75 |
| Volume flow rate* (nL/s) | 4.5 | 5.9 | 9.0 | 13.5 |

The results in Table 1 show that the flow rate is well controlled by modifying the power input to the device 2. Therefore, such a device 2 can operate over a relatively broad flow range. The reason behind this feature is that the bubble generation rate is theoretically proportional to the applied current. In contrast, thermally-generated bubbles are affected by complicated heat transfer conditions and are thus difficult to control with power input.

Figure 7:
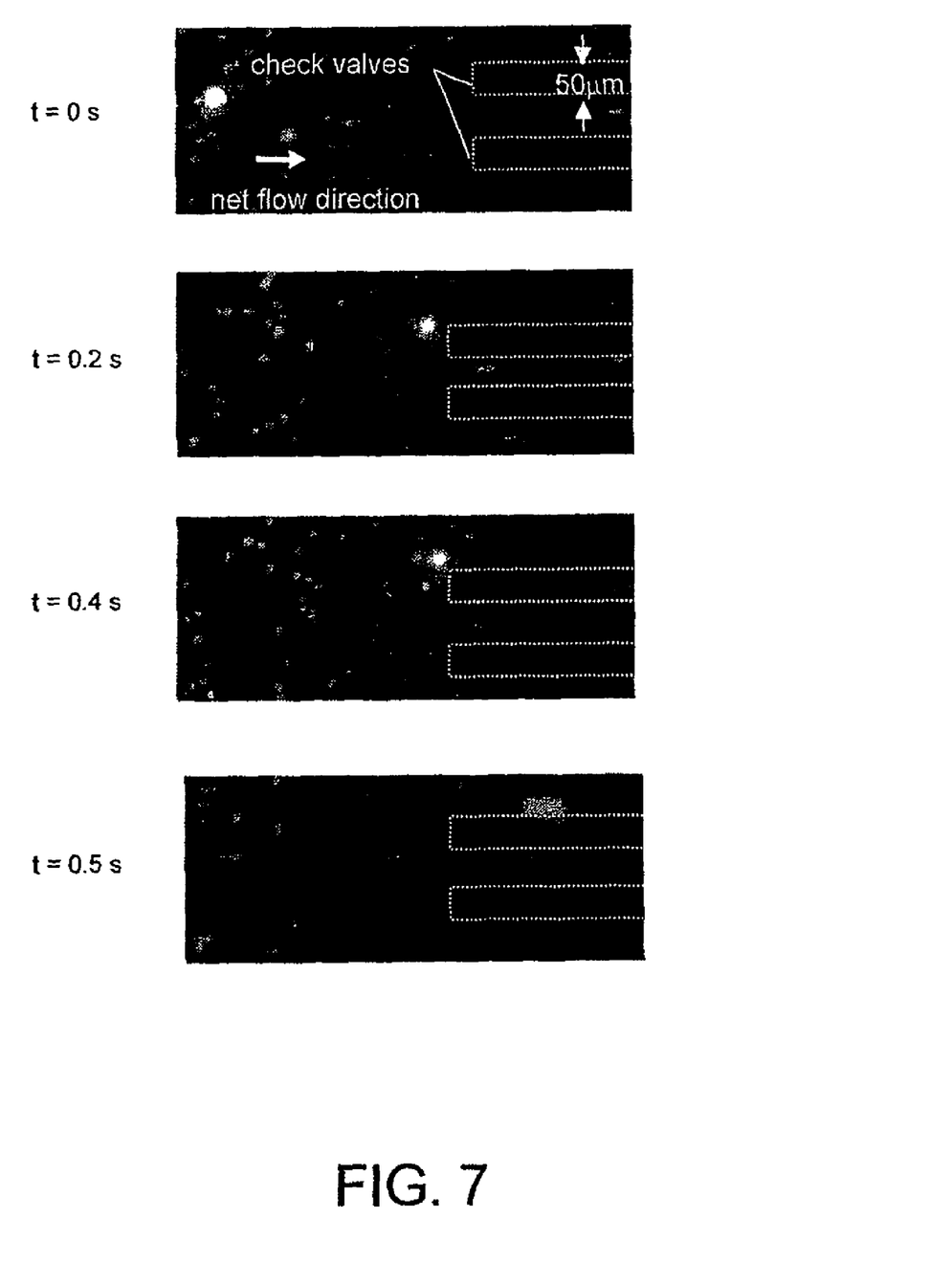
FIG. 7 illustrates a panel of images taken from a fluorescent microscope showing the fluid uptake from a reservoir. The region surrounding the one-way valve located upstream from the bubble generator is shown. Images are shown at 0 seconds, 0.2 seconds, 0.4 seconds, and 0.5 seconds.

In order to verify the fluid circulation more concretely, the fluid uptake from the reservoir was observed through a fluorescent microscope, as shown in FIG. 7. Images were taken at 0 seconds, 0.2 seconds, 0.4 seconds, and 0.5 seconds. The flow close to the inlet of the one-way valve 18 was found to be much steadier (unidirectional with occasional stops) than the flow in the downstream microchannel 8 of the pump 2. This different flow pattern in the same fluidic loop is understandable, however, because the one-way valve 18 effectively blocked bubble growth in the upstream direction (leftward), and the venting membrane 20 buffered the interaction of the two isolated segments of liquid. Unidirectional fluid uptake implies that the fresh liquid (reactant from the reservoir) can be rapidly supplied to the pump 2.

Figure 8:
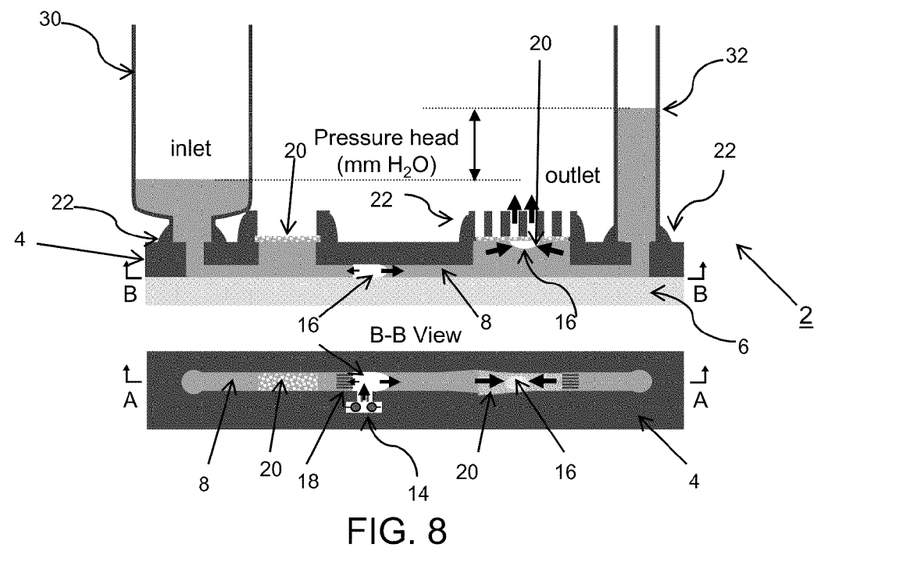
FIG. 8 illustrates an open loop test apparatus used to pump a pressure head between the inlet and the outlet.

FIG. 8 illustrates a fabricated pumping device 2 in an open configuration. In the open configuration, the fluid does not re-circulate within channel 8. Through-holes were etched at the two ends of the straight channel 8, with two glass tubes attached to them by epoxy. Working fluid (water with $Na_2SO_4$) was introduced slowly from the top of the inlet tube 30 by syringe. After the meniscus of the outlet tube 32 rose to the same height as the inlet meniscus (i.e., pressure equalization), DC voltage was applied to the bubble generator 14 and pumping was initiated (in the direction of left-to-right in FIG. 8). The movement of the outlet meniscus during the pumping operation was recorded by a digital video system.

Figure 9:
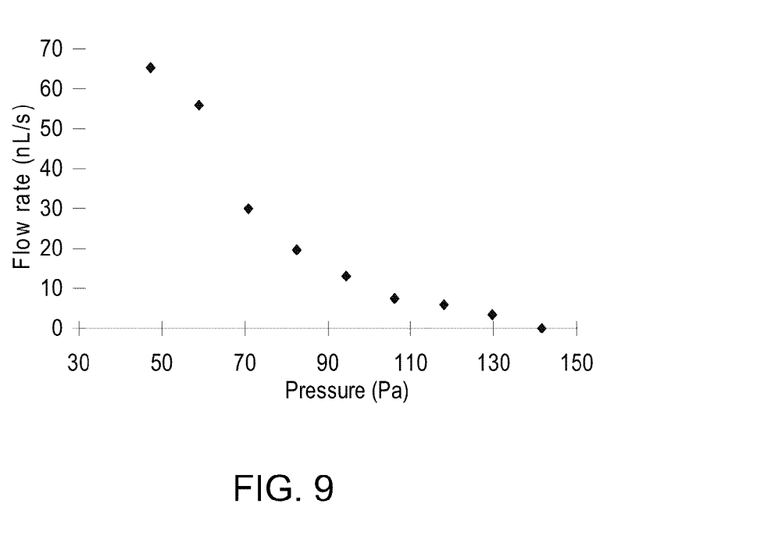
FIG. 9 illustrates a graph of the flow rate vs. pressure head obtained using the open loop test apparatus of FIG. 8.

From the video images, the pumping rate was calculated by multiplying the meniscus velocity by the cross-sectional area of the tube. The pressure head at any given time was determined from the height difference between the inlet meniscus and the outlet meniscus. The measured relationship between the flow rate and the pressure head is shown graphically in FIG. 9. When the pump device 2 is initiated, the two meniscuses are at substantially the same height. At this point, the pressure head is close to zero. Consequently, the maximum flow rate is achieved. In this experiment, the first data point was discarded because the pumping process has not yet stabilized and the flow rate before the first bubble 16 escapes the venting membrane 20 merely reflects the bubble growth rate. The pump rate against approximately 50 Pa of back pressure was measured to be about 60 nl/s. The static pumping pressure, obtained when the outlet meniscus stays at the same level for more than five minutes (which means the flow rate is about zero) was measured to be about 140 Pa.

Figure 10:
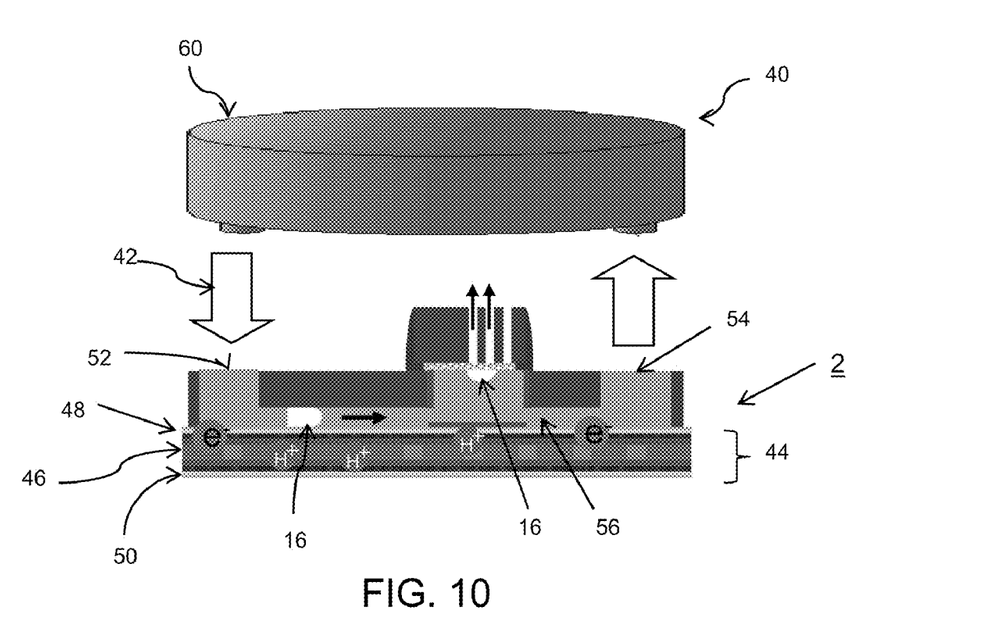
FIG. 10 illustrates a fuel cell having integrated therewith a pumping device that utilizes the gas generated from the fuel cell reaction to provide the motive force to pump or replenish fresh fuel supplies to the fuel cell.

FIG. 10 illustrates a fuel cell 40 having integrated therewith a pumping device 2 that utilizes the gas bubbles 16 generated during the fuel cell reaction to provide the motive force to pump or replenish fresh fuel 42 to the fuel cell 40. The fuel cell 40 typically includes a membrane electrode assembly 44 (MEA) which in turn includes a centrally disposed, protonically-conductive membrane (PCM) 46, which is impermeable to electrons, an anode diffusion layer 48 and cathode diffusion layer 50. The PCM 46 may be composed of a suitable material, such as NAFION. The catalyzed anode face of the PCM may be in intimate contact with an anode diffusion layer 48 which is electrically conductive, and which may be treated to impart some level of hydrophobicity or hydrophilicity to it.

For example, U.S. Pat. No. 6,924,055 discloses and describes a direct methanol fuel cell (DMFC) system that utilizes a fuel delivery cartridge and delivery component which delivers fuel from the fuel cartridge. The '055 patent is incorporated by reference as if set forth fully herein. In the system described in the '055 patent, unlike the embodiment in FIG. 10, the fuel cell requires the use of a pump and gas separators to refresh the fuel system with fuel and remove unwanted gas byproducts.

In the fuel cell 40 illustrated in FIG. 10, a pumping device 2 is disposed adjacent to the anode diffusion layer 48. The pumping device 2 includes an inlet 52 and outlet 54 as well as a channel 56 connecting the two. During the fuel cell reaction, liberated gas bubbles 16 pass through the anode diffusion layer 48 (a bubble generating region) and enter the channel 56 of the pump 2. One or more one-way valves or check valves (not shown in FIG. 10) may be used to prevent bubbles 16 from entering the inlet 52 and/or outlet 54 of the device 2. A downstream portion of the channel 56 includes venting membrane 58 of the type described herein. When the bubbles 16 enter the portion of the channel 56 underneath the venting membrane 58, the bubbles 16 migrate to the underside surface of the venting membrane 58. Because of the permeable nature of the venting membrane 58, the gas within the bubbles 16 passes out of the venting membrane 58 until the bubble 16 is completely eliminated or purged from within the device 2.

As shown in FIG. 10, the inlet 52 and outlet 54 of the device 2 may be connected to a container 60 or the like that contains the fuel 42 (e.g., methanol). In the fuel cell 40 shown in FIG. 10, the bubbles 16 that are created by the fuel cell reaction are harnessed to pump fresh fuel 42 to the fuel cell 40. Fresh fuel 42 is needed because of the localized decrease in reactant concentration that occurs near the MEA 44. Unlike the DMFC system disclosed in the '055 patent, the fuel cell of FIG. 10 does not require an external pump nor does it require a gas separator. Instead, the gaseous byproducts (i.e., bubbles 16) of the chemical reaction taking place within the fuel cell 40 are used to provide the pumping or motive force. In addition, the use of the venting membrane 58 obviates the need for a gas separator because the generated bubbles 16 simply diffuse or bleed through the porous venting membrane 58 to the outside environment. The fuel cell 40 shown in FIG. 10 is particularly well suited for small or micro direct methanol fuel cells (μDMFCs).

With respect to fuel delivery, the fuel cell 40 may have an open configuration in which fresh or new fuel 42 is delivered to the fuel cell 40. Alternatively, the fuel cell 40 may have a closed configuration in which fuel 42 is recycled back to the fuel cell 40.

In still another aspect of the invention, one or more pumping devices 2 (or pumping elements) may be connected together to form a larger device or system. For example, multiple pumping devices 2 may be connected in series or in parallel. The use of multiple pumping devices 2 may increase the overall throughput of the device. It should also be understood that a single pumping element 2 may contain multiple channels 8, bubble generators 14, and venting membranes 20.

While embodiments of the present invention have been shown and described, various modifications may be made without departing from the scope of the present invention. The invention, therefore, should not be limited, except to the following claims, and their equivalents.

What is claimed is:
1. A microfluidic pump comprising:
a channel;
a bubble generator for generating a plurality of bubbles within the channel;
a one-way valve located upstream of the bubble generator; and
a venting membrane disposed over a portion of the channel downstream of the bubble generator.
2. The device of claim 1, wherein the venting membrane comprises a non-wetting porous membrane.
3. The device of claim 1, wherein the bubble generator comprises at least one electrode.
4. The device of claim 1, wherein the bubble generator comprises a heating element.
5. The device of claim 1, wherein the bubble generator comprises a cavitation element.
6. The device of claim 1, wherein the bubble generator comprises a gas injector.
7. The device of claim 1, wherein the bubble generator comprises a chemical reaction.
8. The device of claim 1, wherein the channel forms a closed loop.
9. The device of claim 1, wherein the channel has an open configuration.
10. The device of claim 1, wherein the one-way valve comprises a partial obstruction created with the channel.

11. The device of claim 1, further comprising a one-way valve located in the channel downstream of the venting membrane.

12. The device of claim 2, wherein the non-wetting porous membrane contains pores having an average diameter of less than 1 mm.

13. The device of claim 2, wherein the non-wetting porous membrane contains pores having an average diameter of less than 1 µm.

14. A fuel cell comprising:
   a fuel cell having a bubble generating region; and
   a pump disposed adjacent to the bubble generating region comprising:
      a passageway coupled to a fuel source;
      a one-way valve located upstream of the bubble generating region; and
      a venting membrane disposed over a portion of the passageway downstream of the bubble generating region.

15. The device of claim 14, wherein the fuel source comprises methanol.

16. The device of claim 14, wherein the passageway comprises a microfluidic channel.

17. The device of claim 14, further comprising a one-way valve located downstream of the venting membrane.

18. A method of pumping fluid in a microfluidic environment comprising:
   providing a flow path having a bubble generator and a venting membrane;
   initiating directional flow of fluid within the flow path using bubbles produced by the bubble generator; and
   removing bubbles from the fluid using the venting membrane comprising a non-wetting porous membrane.

19. The method according to claim 18, wherein the flow path forms a closed loop.

20. The method according to claim 18, wherein the flow path has an open configuration.

21. The method according to claim 18, wherein directional flow of fluid is created by a one-way valve located upstream of the bubble generator.

22. The method according to claim 18, wherein the flow path comprises a microfluidic channel.

23. The method according to claim 18, wherein the bubble generator is selected from the group consisting of at least one electrode, a heating element, a cavitation element, a gas injector, and a chemical reaction.

24. A method of pumping fuel in a fuel cell comprising:
   providing a flow path in a fuel cell, the flow path being connected to a fuel source, the flow path further including a venting membrane in a portion thereof;
   initiating directional flow of fuel within the flow path using bubbles generated by the fuel cell;
   removing the bubbles from the fuel using the venting membrane; and
   replenishing the fuel cell with fuel from the fuel source.

25. The method of claim 24, wherein the flow path forms a closed loop.

26. A pumping device comprising:
   a plurality of pumping elements, wherein each pumping element includes:
      a channel;
      a bubble generator for generating a plurality of bubbles within the channel;
      a one-way valve located upstream of the bubble generator; and
      a venting membrane disposed over a portion of the channel downstream of the bubble generator; and
   wherein the plurality of pumping elements are arranged in series.

27. A pumping device comprising:
   a plurality of pumping elements, wherein each pumping element includes:
      a channel;
      a bubble generator for generating a plurality of bubbles within the channel;
      a one-way valve located upstream of the bubble generator; and
      a venting membrane disposed over a portion of the channel downstream of the bubble generator; and
   wherein the plurality of pumping elements are arranged in parallel.

* * * * *

UNITED STATES PATENT AND TRADEMARK OFFICE
CERTIFICATE OF CORRECTION

| | |
|---|---|
| PATENT NO. | : 7,976,286 B2 |
| APPLICATION NO. | : 11/814162 |
| DATED | : July 12, 2011 |
| INVENTOR(S) | : Kim et al. |

Page 1 of 1

It is certified that error appears in the above-identified patent and that said Letters Patent is hereby corrected as shown below:

(54) Replace "METHOD AND APPARATUS FOR PUMPING LIQUIDS USING DIRECTIONAL GROWTH AND ELIMINATION BUBBLES" with -- METHOD AND APPARATUS FOR PUMPING LIQUIDS USING DIRECTIONAL GROWTH AND ELIMINATION OF BUBBLES --

Col. 1, Line 1, Replace "METHOD AND APPARATUS FOR PUMPING LIQUIDS USING DIRECTIONAL GROWTH AND ELIMINATION BUBBLES" with -- METHOD AND APPARATUS FOR PUMPING LIQUIDS USING DIRECTIONAL GROWTH AND ELIMINATION OF BUBBLES --

Signed and Sealed this
Eighth Day of November, 2011

David J. Kappos
*Director of the United States Patent and Trademark Office*